(12) United States Patent
Barnard et al.

(10) Patent No.: US 6,669,274 B2
(45) Date of Patent: Dec. 30, 2003

(54) GRILLE ATTACHMENT TO HOODS

(75) Inventors: Ian Barnard, Troy, MI (US);
Christopher M. Hartwell, Troy, MI (US); James M Zubkus, Northville, MI (US); Patrick H Predd, Wixom, MI (US); Chao H Mao, Rochester Hills, MI (US)

(73) Assignees: DaimlerChrysler Corporation, Auburn Hills, MI (US); Lacks Enterprises, Inc., Southfield, MI (US); Textron Fastening Systems, Sterling Heights, MI (US)

( * ) Notice: Subject to any disclaimer, the term of this patent is extended or adjusted under 35 U.S.C. 154(b) by 0 days.

(21) Appl. No.: 10/072,754

(22) Filed: Feb. 7, 2002

(65) Prior Publication Data

US 2003/0052515 A1 Mar. 20, 2003

Related U.S. Application Data

(60) Provisional application No. 60/323,858, filed on Sep. 20, 2001.

(51) Int. Cl.[7] .................................................. B60L 19/52
(52) U.S. Cl. ...................... 296/193.1; 296/29; 411/389; 411/104
(58) Field of Search ................................ 296/191, 194, 296/29, 193.1, 193.11; 293/115, 155; 411/104, 182, 389; 248/222.14; 403/24

(56) References Cited

U.S. PATENT DOCUMENTS

| | | | |
|---|---|---|---|
| 3,792,889 A | | 2/1974 | Fuener et al. |
| 4,095,831 A | * | 6/1978 | Hagiwara et al. ............ 293/126 |
| 4,157,674 A | * | 6/1979 | Carlson et al. .............. 411/389 |
| 4,186,645 A | * | 2/1980 | Zaydel ....................... 411/389 |
| 4,223,585 A | * | 9/1980 | Barth et al. ................. 411/389 |
| 4,261,151 A | | 4/1981 | Ito |
| 4,354,566 A | | 10/1982 | Yuda |
| 4,373,826 A | | 2/1983 | Inamoto et al. |
| 4,393,561 A | | 7/1983 | Yuda |
| 4,597,603 A | | 7/1986 | Trabert |
| 4,645,250 A | | 2/1987 | Bauer et al. |
| 4,828,440 A | | 5/1989 | Anderson et al. |
| 4,861,182 A | | 8/1989 | Gillet |
| 4,875,728 A | * | 10/1989 | Copp et al. .................. 293/155 |
| 4,917,203 A | | 4/1990 | Sacco et al. |
| 4,973,102 A | * | 11/1990 | Bien .......................... 296/191 |
| 5,100,188 A | | 3/1992 | Stieg |
| 5,141,282 A | | 8/1992 | Fujiwara |
| 5,195,793 A | * | 3/1993 | Maki .......................... 293/155 |
| 5,205,597 A | | 4/1993 | Chase |
| 5,478,127 A | | 12/1995 | Chase |
| 5,503,444 A | | 4/1996 | Rouse et al. |
| 5,865,500 A | | 2/1999 | Sanada et al. |
| 6,146,071 A | * | 11/2000 | Norkus et al. ............... 411/104 |

\* cited by examiner

*Primary Examiner*—Stephen T. Gordon
*Assistant Examiner*—Jason Morrow
(74) *Attorney, Agent, or Firm*—Marc J Luddy

(57) ABSTRACT

A floating bracket has a flexible interface between a vehicle body panel and a vehicle. The floating bracket is slidably interfaced with a vehicle body panel. The floating bracket is rigidly fixed to a point on the vehicle. The floating bracket enables expansion or contraction of the vehicle body panel to take place. Accordingly the vehicle body panel may slide with respect to the vehicle. Thus, the vehicle body panel is free to move yet is still fixedly attached to the vehicle.

5 Claims, 4 Drawing Sheets

GRILLE ATTACHMENT TO HOODS

PRIORITY CLAIM

This application claims the benefit of U.S. Provisional Application No. 60/323,858, filed Sep. 20, 2001.

FIELD OF THE INVENTION

The present invention generally relates to attachment mechanisms to attach vehicle body panels to vehicles. More particularly, the present invention relates to attachment mechanisms which enable thermal expansion of vehicle body panels.

BACKGROUND OF THE INVENTION

Various methods of attaching panels to vehicles have been developed throughout the years. The majority of which include securely fixing the panels to the vehicle via a fixed bracket. As a result, the panel is fixed rigidly to the vehicle at each bracket location. Any shifting or moving of the body panel, such as to compensate for thermal expansion, results in various levels of stress at these points. Thermal expansion may occur for various reasons. The proximity of an attached body panel to an engine or an exhaust system could expose the panel to extreme temperatures. Additionally, simple exposure to the heat of the sun may cause a panel to experience significant thermal expansion.

Thermal expansion causes panel damage at the points of attachment. These points tend to be at the lateral edges of a panel, where thermal expansion results in the edges bowing or otherwise deflecting. Additionally, at each of the fixed attachment points, torque dimples are present when thermal expansion occurs. As a result of the bowing and dimpling, the body panel fails to maintain its aesthetic qualities and in some cases becomes fatigued at the connection locations.

It is therefore desirable to have an attachment mechanism for vehicle body panels, which enables thermal expansion or other motion of the body panel while not negatively affecting the body panel. Further, it is desirable to compensate for thermal expansion or other body panel movement as well as to avoid bowing, deflection or dimpling.

SUMMARY OF THE INVENTION

It is an object of the present invention to provide a floating bracket which enables attachment of various vehicle panels to a vehicle. The floating bracket of the present invention enables shifting or thermal expansion of body panels relative to the vehicle. Shifting or other motion is able to occur while maintaining a secure attachment between the vehicle and the body panel.

A floating bracket in accordance with the present invention comprises a bracket body having upper and lower portions. The upper and lower portions are integrally formed atop of one another and define first and second parallel channels. The channels are disposed on first and second sides of the bracket body. Additionally, a third channel is defined and is disposed on a third side of the bracket body. The third channel runs substantially perpendicular to the first and second channels. First and second spring arms extended from the upper portion. The spring arms hold the bracket in an initial assembly position with respect to the body panel. Also, first and second stoppers protrude from the lower portion of the bracket body. The stoppers essentially block an open end of the first and second parallel channels and prohibit improper assembly. A hole runs through the bracket body. A bolt post is secured in the hole. The bolt post, in conjunction with a nut and washer, rigidly attach the floating bracket to a point on the vehicle.

Using the floating bracket, a body panel may be attached to the vehicle in the following manner. Initially, at least one floating bracket is slidably attached to a receiving bracket on the body panel. The body panel is then bolted to a fixed point on the vehicle by way of the bolt post of the floating bracket. In this manner, the floating bracket is rigidly attached to a fixed point on the vehicle and the body panel is slidably attached to the floating bracket. Accordingly, the body panel may be fixed to the vehicle while still providing growth room for thermal expansion or other motion.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
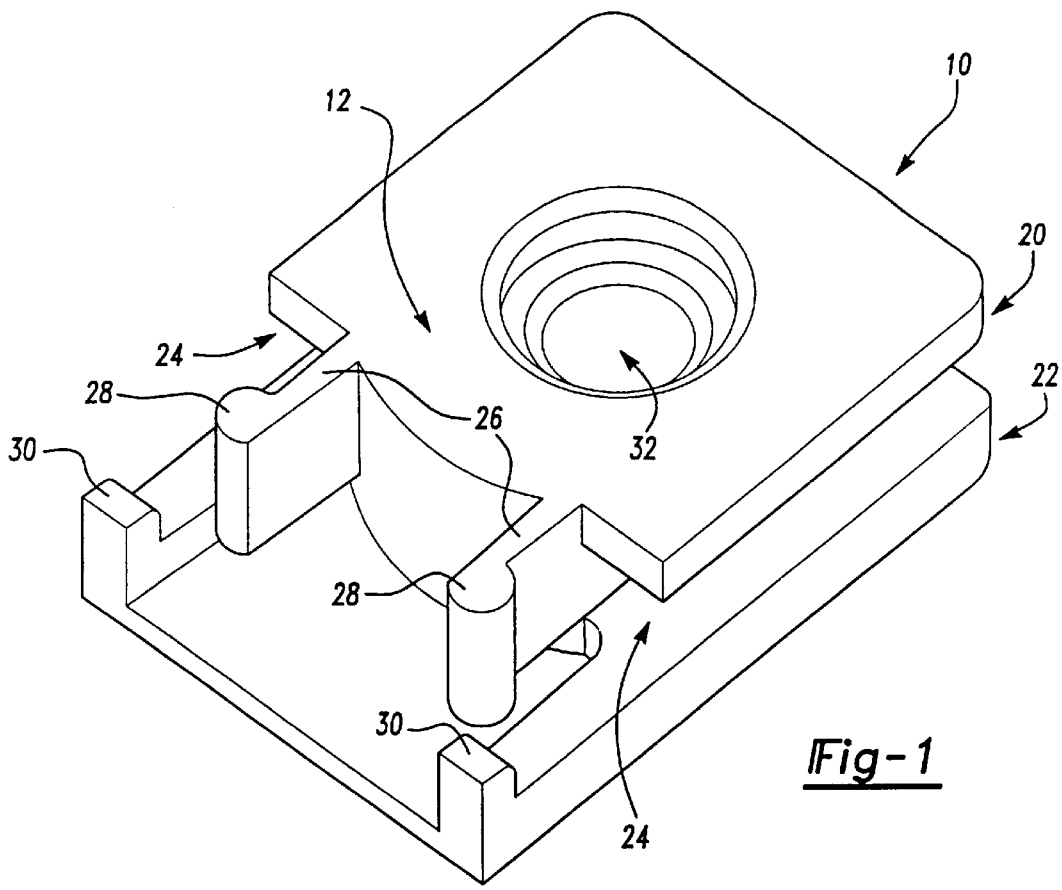
FIG. 1 is a perspective view of a floating bracket in accordance with the principles of the present invention.
Figure 2:
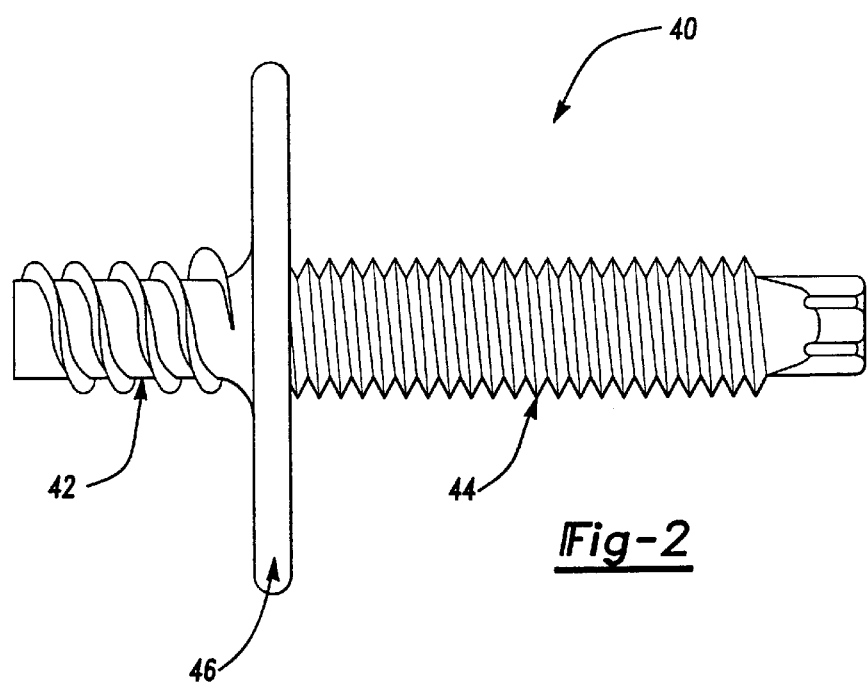
FIG. 2 is a side elevation of a bolt in accordance with the principles of the present invention.

With particular reference to FIG. 1 a perspective view of a floating bracket 10 is shown. The floating bracket 10 of the present invention comprises a main body 12 having upper and lower portions 20, 22. The upper and lower portions 20, 22 are disposed as such to form first and second parallel channels 24 along the sides of the floating bracket 10. First and second parallel spring arms 26 extend horizontally from the upper portion 20. Each spring arm 26 includes a head 28 disposed at its end. First and second stoppers 30 are disposed on the lower portion 22. First and second stoppers 30 serve to block one end of said first and second parallel channels 24. A hole 32 runs through the main body 12 and bolt 40 is screwably attached therein. The top edge of hole 32 is chamfered for easy insertions of bolt 40. Bolt 40 is detailed in FIG. 2. A first threaded end 42 and a second threaded end 44 are disposed on opposing ends of bolt 40. A washer 46 is fixed between the ends 42, 44. The first threaded end 42 of bolt 40 is threaded into hole 32.

Figure 3:
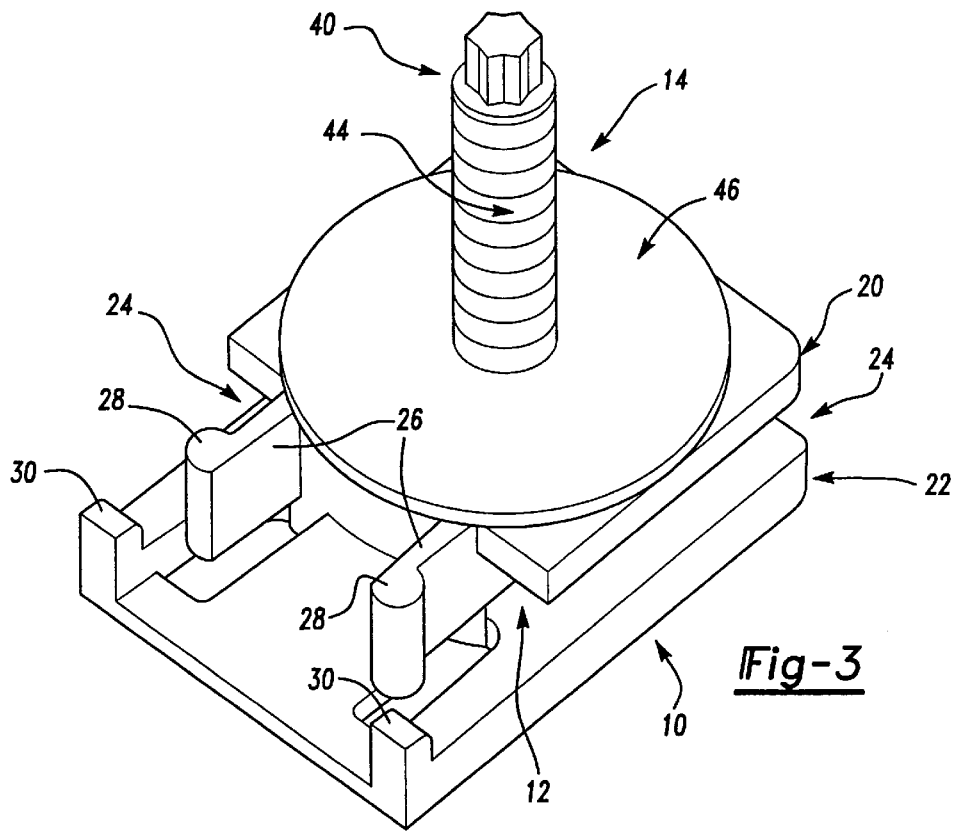
FIG. 3 is a perspective view of a floating bracket having a bolt attached to thereto in accordance with the principles of the present invention.

With reference to FIG. 3 a floating bracket assembly 14 is shown. The assembly 14, of FIG. 3, includes a combination of floating bracket 10 and threaded bolt 40. The floating bracket assembly 14 is an attachment interface between a vehicle body panel and the vehicle.

Figure 4:
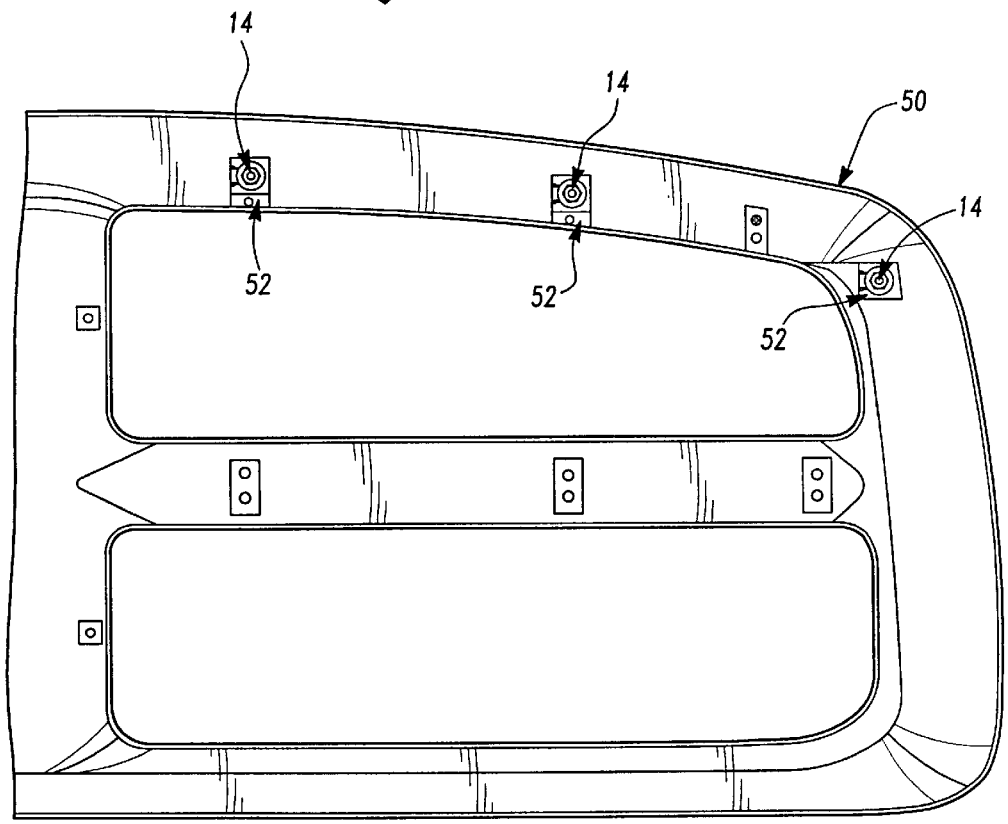
FIG. 4 is a rear elevation view of a vehicle grill utilizing floating brackets in accordance with the principles of the present invention.
Figure 5:
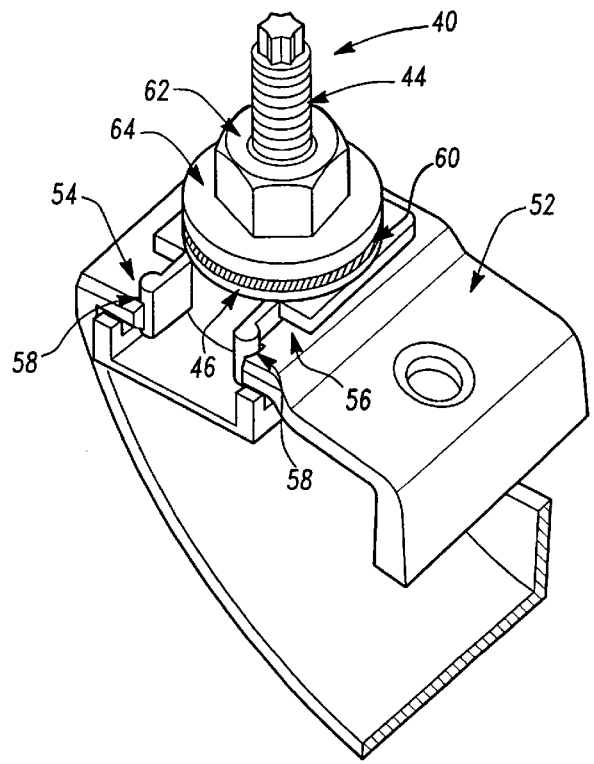
FIG. 5 is a detailed perspective view of the assembly of a grill and floating bracket in accordance with the principles of the present invention.

With particular reference to FIG. 4 an exemplary embodiment of the present invention will be detailed. As noted previously, the preferred embodiment is merely exemplary in nature and is no way intended to limit the invention. FIG. 4 is a rear elevation view of a front grill 50 of a vehicle (not shown). The front grill 50 utilizes a plurality of floating bracket assemblies 14 to attach to the hood (not shown) of a vehicle. Integrally formed receiving brackets 52 are disposed around the front grill 50. The receiving brackets 52 are best shown in FIG. 5. The grill 50 receiving brackets 52 have a general U shape to receive the floating bracket assembly 14. The U includes first and second edges 54, 56. The edges 54, 56 are received in the first and second parallel channels 24 of the floating bracket 10. The floating bracket assembly 14 is received into the receiving bracket 52 of the grill 50 during initial assembly. The spring arms 26 lock into recess portions 58 of the first and second edges 54, 56 of the receiving bracket 52, using head 28. Accordingly the floating bracket assembly 14 is securely held within the receiving bracket 52 of the grill 50 to enable safe transport of the grill 50, without losing the floating bracket assemblies 14. With the floating bracket assemblies 14 assembled onto the grill 50, the grill 50 is now ready for assembly onto a vehicle.

Figure 7A:
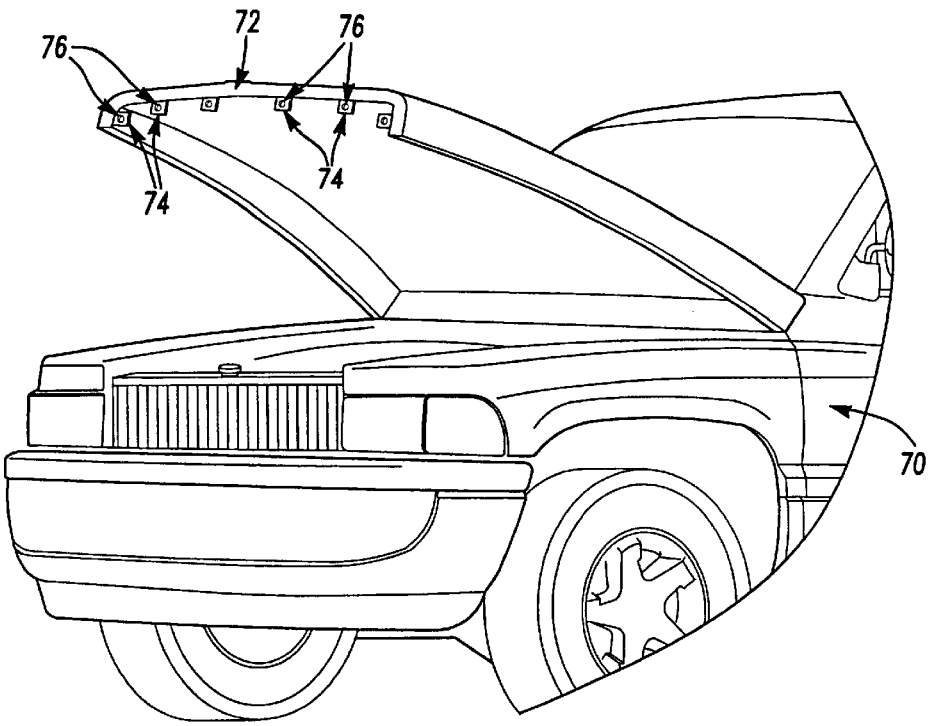
FIGS. 7a and 7b are schematic views of a vehicle according to the principles of the present invention.
Figure 7B:
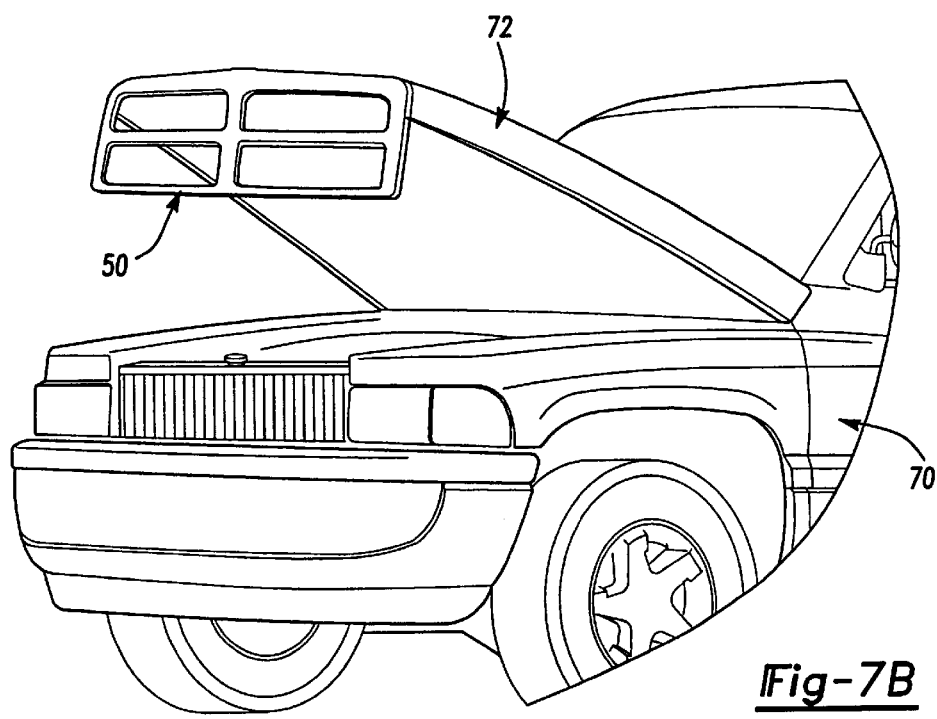

With reference to FIGS. 7a and 7b, a vehicle 70 is shown. The vehicle 70 has a hood 72 with mounting brackets 74. Each mounting bracket 74 has a hole 76 to receive bolt 40. The floating bracket assembly 14 is rigidly attached to die mounting bracket 74. FIG. 7b illustrates the grill 50 attached to the hood 72 of the vehicle 70. The assembly is best shown in FIG. 5. A nut 62, washer 64, and optional spacer 60 fasten with bolt 40 to rigidly attach the floating bracket assembly 42 to the vehicle mounting bracket 74. Thus, while the floating bracket assembly 14 is rigidly attached to the vehicle, the grill 50 is free to slide along the interface between the floating bracket and the receiving bracket 52 of the grill 50.

Figure 6A:
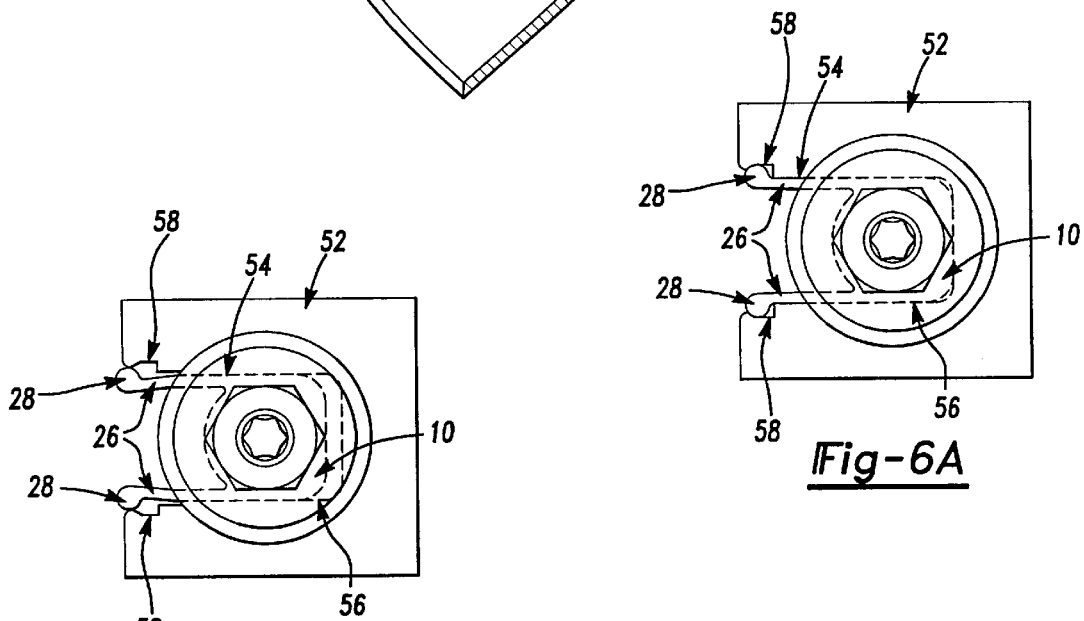
FIGS. 6a, 6b and 6c are operational views of the movements of a floating bracket in accordance with the principles of the present invention.
Figure 6B:
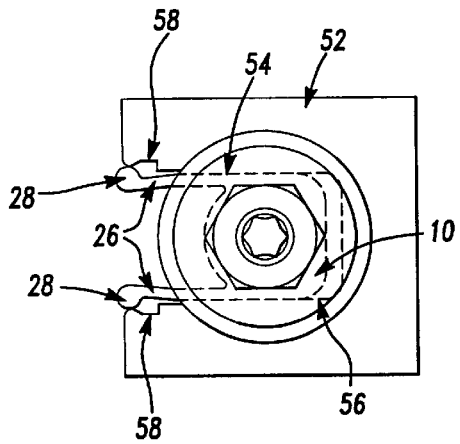
Figure 6C:
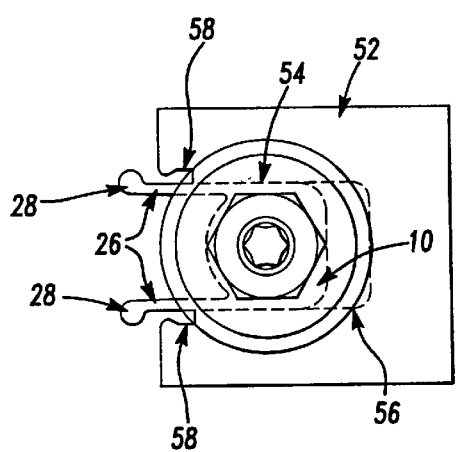

The sliding motion is best shown in FIGS. 6a, 6b and 6c. The initial assembly position of the floating bracket assembly 14 in receiving bracket 52 is shown in FIG. 6a. The spring arm heads 28, via a force, are released from the recessed portions 58 of receiving bracket 52. The receiving bracket 52 may slide relative to floating bracket assembly 14. FIG. 6c illustrates a significant amount of sliding action which is achieved. Thus, the grill 50 may thermally expand in either a left or right direction to a significant degree. The floating bracket assembly 14 enables the thermal expansion to take place without dimpling stress fracturing or warping of the lines of grill 50. Thus the vehicle panel, in this case grill 50, may maintain its aesthetic characteristics throughout the vehicle's use.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A vehicle comprising:
   at least one body panel having at least one receiving bracket disposed thereon;
   at least one floating bracket slidably interfaced with said at least one receiving bracket;
   at least one vehicle structure having a mounting bracket such that said floating bracket may be rigidly attached thereto; and
   wherein said floating bracket acts as an interface between said vehicle structure and said panel such that said panel is slidably attached to said vehicle structure; and
   wherein said floating bracket comprises:
      a bracket body having upper and lower portions, said upper and lower portions being formed together so as to define first and second parallel channels disposed on first and second sides of said bracket body;
      first and second spring arms extending from said upper portion;
      first and second stoppers protruding from said lower portion, said stoppers blocking an open end of said first and second parallel channels; and
      a hole through said bracket body for securing a bolt post therein.

2. The vehicle of claim 1, wherein a head portion is disposed on each of said springs arms.

3. The vehicle of claim 1, wherein said hole is chamfered.

4. The vehicle of claim 1, wherein said bolt post comprises first and second threaded portions having a washer disposed therebetween.

5. The vehicle of claim 1, wherein said floating bracket is rigidly attached to said vehicle structure via a bolt.

* * * * *